United States Patent [19]

Crowe et al.

[11] 4,377,402
[45] Mar. 22, 1983

[54] CO₂ SNOW-MAKING PROCESS

[75] Inventors: Orland F. Crowe, Fort Smith, Ark.; Richard E. Gaber, Houston, Tex.; James R. Forbes, Lockport, Ill.

[73] Assignee: Liquid Carbonic Corporation, Chicago, Ill.

[21] Appl. No.: 269,264

[22] Filed: Jun. 1, 1981

[51] Int. Cl.³ .................................................. F25J 1/00
[52] U.S. Cl. .............................................. 62/10; 62/35
[58] Field of Search ................... 62/10, 12, 35, 66, 74, 62/340

[56] References Cited

U.S. PATENT DOCUMENTS

| | | |
|---|---|---|
| 3,443,389 | 5/1969 | Townsend et al. ................. 62/10 |
| 3,660,985 | 5/1972 | Tyree, Jr. . |
| 3,672,181 | 6/1972 | Tyree, Jr. . |
| 3,754,407 | 8/1973 | Tyree, Jr. . |
| 3,901,044 | 8/1975 | Vahl ................................... 62/10 |
| 3,932,155 | 1/1976 | Pietrucha et al. . |

Primary Examiner—Frank Sever
Attorney, Agent, or Firm—Fitch, Even, Tabin, Flannery & Welsh

[57] ABSTRACT

Preparatory to its supply to snow horns, high-pressure liquid CO₂ flows through a heat-exchanger where it is cooled by R-13 refrigerant, reducing the temperature of the high-pressure liquid to about −60° F. at normal use rates. R-13 refrigerant is compressed and condensed against R-502, which is in turn compressed and condensed at ambient air temperature. Subcooled liquid CO₂ at about 300 psig. provides an additional 7 weight percent snow over such liquid at 0° F. A control system on each snow-making apparatus monitors the temperature of the subcooled liquid CO₂ just upstream of expansion devices at the snow horns, and depending upon the temperature which is sensed, the control system changes the duration of time that liquid CO₂ is supplied to a snow-making hood to assure a metered quantity of CO₂ snow.

5 Claims, 2 Drawing Figures

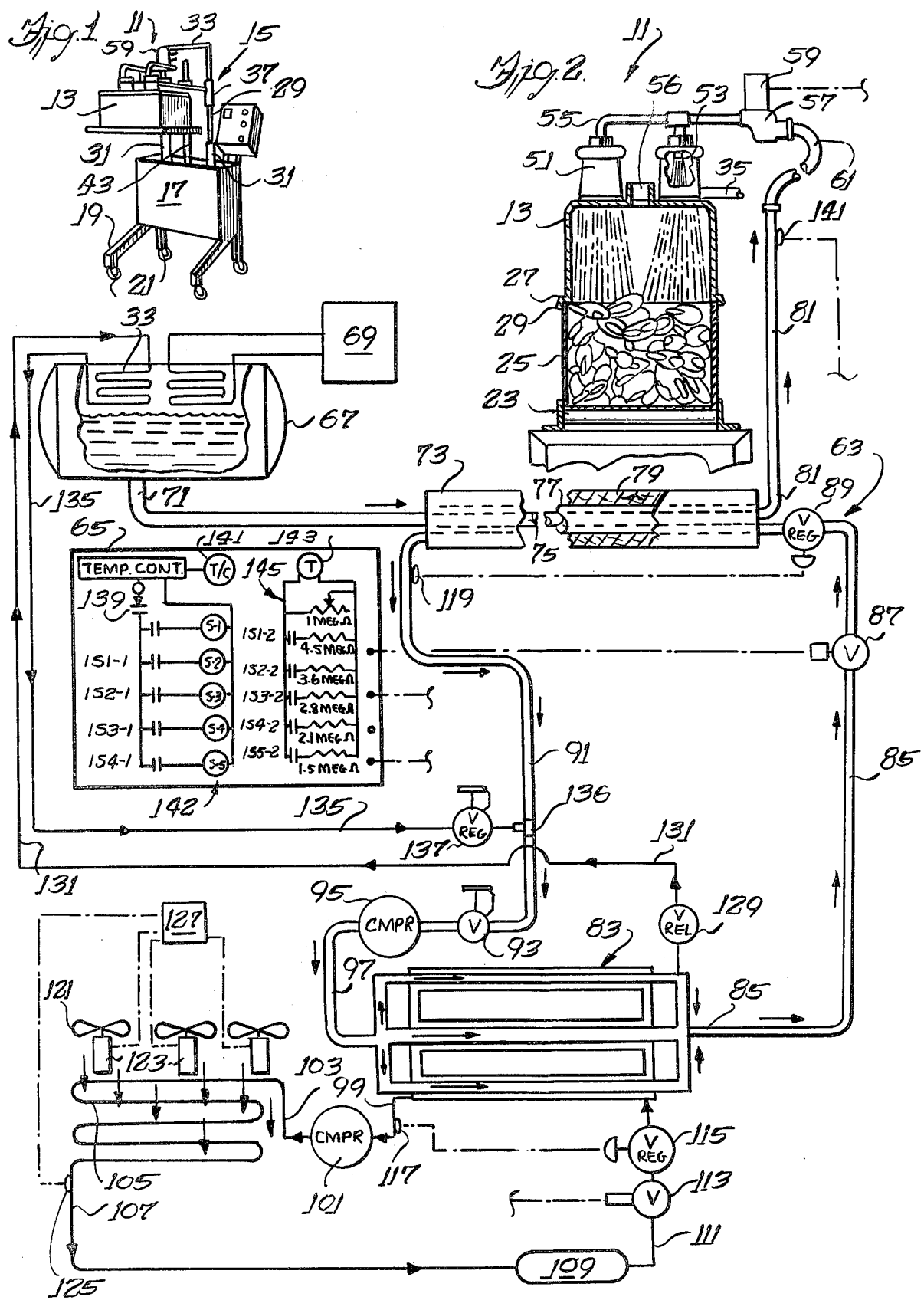

$CO_2$ SNOW-MAKING PROCESS

This invention relates to systems for making carbon dioxide snow and more particularly to systems for efficiently producing metered quantities of carbon dioxide snow.

BACKGROUND OF THE INVENTION

Many food products, such as meat and fowl, are transported in refrigerated condition by the application thereto of carbon dioxide snow. These products may be maintained either in completely frozen condition or at a temperature just above freezing, in both instances with the $CO_2$ snow serving to compensate for heat leakage into the overall food product container.

Oftentimes such products are packed in containers having the shape of a rectangular parallelepiped which are transported along a conveyor in an open-top condition. The food products may have been previously chilled or frozen. When the product-carrying container reaches a station, its arrival is detected, and a proportionately sized hood is caused to descend and mate with the open-top container, or the container may enter an enclosure that can accommodate containers of various sizes. At this time, a charge of liquid $CO_2$ is fed to one or more snow horns which include expansion nozzles through which the liquid $CO_2$ expands to a mixture of $CO_2$ snow and vapor. The snow is driven downward into the interstices of the product mass in the container, and the vapor exhausts through an exit, usually to a line leading to the exterior of the processing plant. Such equipment has been commercially available for over ten years and has established a place in the food processing industry.

Various attempts have been made to improve upon the basic equipment and provide more efficient usage of liquid $CO_2$. For example, U.S. Pat. No. 3,932,155 discloses a snow-making system of this general type which takes liquid $CO_2$ from the standard storage tank, that is at about 300 psig and 0° F., and drops its pressure in an insulated chamber, termed a "subcooler," so as to create a reservoir of liquid $CO_2$ at about 150 psig and about $-30°$ to $-35°$ F., which liquid $CO_2$ is then subsequently expanded through a snow horn of special design to create "soft" $CO_2$ snow. A minor amount of precooling of the liquid $CO_2$ before its drop in pressure is achieved by circulation through a hollow chamber surrounding the snow horn; however, this arrangement merely drops the temperature of the liquid $CO_2$ one or two additional degrees F.

U.S. Pat. No. 3,660,985, issued May 9, 1972, shows somewhat related equipment wherein similar subcooling of a reservoir of liquid $CO_2$ was carried out so as to lower its temperature; however, an arrangement was included for repressurizing the reservoir immediately prior to its use so the cold liquid being expanded would be at a higher pressure. U.S. Pat. No. 3,672,181 shows a tunnel-type $CO_2$ cooler wherein the liquid $CO_2$ has its temperature lowered on the way to expansion nozzles within the tunnel by flowing through a heat-exchanger located at the bottom of the tunnel onto which $CO_2$ snow would gravitate if it fell below the conveyor belt. U.S. Pat. No. 3,754,407, issued Aug. 28, 1973, illustrates a system for establishing reservoirs of liquid $CO_2$ at locations in the vicinity of snow-making equipment, which locations were distant from the standard $CO_2$ storage tank. As a part of the system, a reservoir of lower pressure, colder liquid $CO_2$ is established within an insulated heat-exchanger that is used to cool the high-pressure liquid $CO_2$ flowing toward a holding tank that is located near the snow-making equipment.

It has been found that, in systems of this general type, the usage of which will be subject to the rate at which the food processing plant loads the food product-carrying containers onto the conveyors, there will be a considerable variance in the hourly rate at which liquid $CO_2$ is expanded through the snow horns. Efficient use of this apparatus depends upon providing a metered charge of $CO_2$ snow to each container so that both under-filling and over-filling are avoided and also depends somewhat upon efficient use of the liquid $CO_2$. It is of course known that the quality of carbon dioxide changes with the change of its temperature, e.g., expansion of liquid $CO_2$ at about $-60°$ F. may result in the creation of about 57 weight percent snow whereas expansion of liquid $CO_2$ at about 0° F. will create not more than about 47 weight percent snow. Ways for increasing the efficiency of snow-making apparatus of this type have been continuously sought after.

BRIEF SUMMARY OF THE INVENTION

It has been found that, by causing high-pressure liquid $CO_2$ to flow through a heat-exchanger that is cooled by refrigerant such as R-13, the temperature of the high-pressure liquid can be reduced to about $-60°$ F. at normal use rates. The R-13 refrigerant is condensed against a suitable chlorinated-fluorocarbon, such as R-502, which is in turn condensed at ambient air temperature. Liquid $CO_2$ remaining at about 300 psig, by means of such subcooling, can provide an additional 7 weight percent snow over such liquid at 0° F. (standard tank temperature and pressure). A control system is employed on each snow-making apparatus which monitors the temperature of the subcooled liquid $CO_2$ upstream of expansion devices at the snow horns, and depending upon the temperature which is sensed, the control system changes the duration of time that liquid $CO_2$ is supplied to a snow-making hood whereby it is assured that a metered quantity of $CO_2$ snow is delivered to each underlying container.

BRIEF DESCRIPTION OF THE DRAWINGS

FIG. 1 is a perspective view of a representative snow-making apparatus having a hood proportioned to fit atop an open-top food-product-carrying container; and FIG. 2 is a diagrammatic view showing liquid $CO_2$ being expanded to snow which is being delivered to the underlying container, together with a schematic view of the liquid $CO_2$ subcooling and delivery system, plus a representative control system for effecting the automatic operation of the snow-making apparatus.

DETAILED DESCRIPTION OF THE PREFERRED EMBODIMENT

Depicted in FIG. 1 is a snow-making apparatus 11 which is designed to deliver $CO_2$ snow to open-top containers which are transported along a horizontal conveyor past the apparatus. Basically, the apparatus 11 contains a snow hood 13 that is mounted on a carriage 15 designed for vertical reciprocating movement, supported above a lower chassis 17 which has four legs 19 equipped with rollers 21 to facilitate placement at a desired location along a conveyor.

In FIG. 2, the hood 13 is shown in operative position overlying an open-top container 25 that rests on a roller conveyor 23. One of the primary fields where the apparatus 11 finds its use is the chilling of fresh poultry. Accordingly, the container 25 may be a box formed of corrugated fiberboard that is filled with fresh chickens. The hood 13 is sized so that it mates with the upper edge of a corrugated box as a result of the provision of a generally horizontal peripheral flange 27 having a downturned extension 29 which accommodates the upper edge of the box or container 25.

The chassis 17 includes a pair of generally vertical, circular cross section posts 29 which extend upwardly and are accommodated in supporting holders 31. A brace 33 interconnects the tops of the posts 29 and adds rigidity. The carriage 15 includes a pair of arms 35 mounted at their front end to the hood 13 and at the rear ends to a pair of sleeves 37 which slide on the posts 29. A drive rod 43 connected at its upper end to the carriage and at its lower end to a double-acting air cylinder (not shown) causes the hood to reciprocate vertically between a ready position, located well above the conveyor, and an operative position wherein the inside surface of the flange 27 is generally sealed against the upper edge and the outside rim of the container, as shown in FIG. 2.

The illustrated snow hood 13 carries four snow horns 51, each having an expansion nozzle 53 through which high-pressure liquid $CO_2$ is flashed to a mixture of $CO_2$ snow and vapor. The snow horns 51 direct the snow downward and into the interstices of the mass of poultry which is packed in the corrugated container. A vent 56 is provided in the top surface of the hood 13, located generally centrally thereof, which provides an exit for the $CO_2$ vapor and which in most instances is connected to a flexible conduit leading to a line which takes it exterior of the processing plant. Liquid $CO_2$ is supplied to the expansion nozzles 53 via a conduit network 55 that connects to a valve 57 which is controlled by a solenoid 59. Liquid $CO_2$ is supplied to the valve 57 through a flexible high-pressure hose 61 which permits the vertical reciprocating movement of the carriage.

A liquid $CO_2$ supply system 63 is provided for delivering low-temperature $CO_2$ to the snow-making apparatus. Control of the overall operation is effected by a master control system 65 mounted on the chassis 17. The $CO_2$ supply system 63 includes a standard $CO_2$ tank 67 designed to hold liquid $CO_2$ at about 300 psig and 0° F. A standard mechanical refrigeration unit 69 is associated with the storage tank which includes a set of coils which are located in the vapor head portion of the tank and which serves to condense vapor as necessary to maintain the tank pressure (and temperature) within the desired operating limits. The tank 67 has a liquid outlet line 71 that will carry the liquid carbon dioxide at a temperature of about 0° F. and that is desirably insulated. The line 71 leads to the point of use, and depending upon its length, a suitable circulating pump (not shown) may be included. The line 71 leads to a heat-exchanger 73 which serves to subcool the liquid $CO_2$ well below its entering temperature of about 0° F.

For purpose of definition with respect to this patent application, a mechanical refrigeration unit is considered to be one which utilizes the application of thermodynamics wherein the cooling medium or refrigerant goes through a cycle wherein it is recovered and reused. The commonly used basic cycles are the vapor-compression cycle, the absorption cycle, the steam-jet cycle and the steam-ejector cycle. Each cycle operates between two pressure levels and uses a two-phase working medium which alternates cyclically between the liquid and vapor phases. The herein-illustrated system uses the vapor-compression cycle which includes an evaporator in which the liquid refrigerant boils at low temperature to produce cooling, a compressor which raises the pressure and temperature of the gaseous refrigerant, a condenser in which the refrigerant discharges its heat to return to liquid phase and an expansion device through which the liquid expands from the high-pressure level in the condenser to the low-pressure level in the evaporator. The refrigerant is the substance that is suitable as the working medium and is capable of absoring heat at a desirably low temperature (in the evaporator) and subsequently releasing the absorbed heat at a higher temperature (in the condenser) when it returns to the liquid phase.

The heat-exchanger 73 may be any of the conventional designs available on the market; however, it may conveniently be formed from an elongated central tube 75 through which the liquid $CO_2$ flows that is disposed coaxially within a surrounding larger diameter tube 77 through which a chlorinated fluorocarbon is caused to flow preferably in countercurrent direction. The outer tube 77 is preferably surrounded by suitable insulation 79, such as three inches of foam polyurethane, covered with PVC. For example, the heat-exchanger can be made part of a piping system to convey the liquid $CO_2$ from the remote tank location to the point of end use and in this respect may constitute about 100 feet of copper tubing having an interior diameter of an inch to an inch and a quarter disposed coaxially within surrounding tubing 2 to $2\frac{1}{2}$ inches in interior diameter. If desired, baffling of the type known in the art may be included within the annular region formed by the coaxial tubes so as to extend the path of travel of the cold refrigerant vapor.

The liquid carbon dioxide leaves the subcooler 73 via an exit 81 at the opposite end which leads to the flexible line 61 that supplies the snow-making apparatus 11. The design of the liquid $CO_2$ supply system 63 is preferably such that the temperature of the liquid $CO_2$ in the exit line 81 is about −60° F. under normal operating conditions. With respect to the illustrated system, snow-making will occur intermittently, the snow hood 13 being alternately raised to permit removal of the container after it has been charged with snow and to allow entry of the next container in line and then lowered to its operative position; although certain of the features of the invention would also be applicable to a snow-making unit of a continuous type. In this respect, the heat-exchanger 73 should have a liquid $CO_2$ capacity equal to a volume about three times the volume of liquid $CO_2$ that will be expended for about each "shot" or "charge" of snow for a container. This relationship assures that the desired heat transfer takes place within the subcooler 73 to lower the temperature about −60° F.

It has been found that the employment of a mechanical refrigeration system for cooling the liquid $CO_2$ in the subcooler operates extremely efficiently and without the need for precise control when the $CO_2$ is cooled by a refrigerant having a temperature of between about −60° F. and about −75° F. at about 20 psig. or above, and it in turn is condensed by a second refrigerant having a temperature of between about 10° F. and about −10° F. at about 20 psig. or above. Preferably, the lower temperature refrigerant is R-13, and the higher temperature refrigerant is R-502. R-13 is a chlorinated fluorocarbon, which chemically is chlorotrifluoromethane ($CClF_3$) having a boiling point of about $-70°$ F. at a pressure of about 32 psig and which, at a pressure of about 225 psig, can be condensed to liquid at a temperature of about 20° F. It has likewise been found that a complementary refrigerant is R-502, which chemically is an azeotropic mixture of chlorodifluoromethane ($CHClF_2$) 48.8 weight percent and chloropentafluoroethane ($ClF_2CCF_3$) 51.2 weight percent, having a boiling point of about 0° F. at a pressure of about 31 psig and which can be condensed to liquid at a temperature of about 70° F. at a pressure of about 137 psig, so as to allow the efficient use of an ambient air-cooled condenser.

The illustrated liquid $CO_2$ supply system includes a heat-exchanger 83 which serves as a condenser-evaporator for the two-refrigerant system. It may, for example, be a tube and shell-type heat-exchanger, with the R-13 refrigerant being circulated on the tube side and the R-502 refrigerant being circulated on the shell side, or any suitable heat-exchanger may be used. The tube manifold connects to an outlet line 85 which leads to the end of the subcooler 73 adjacent the snow-making apparatus. The line 85 includes a solenoid operated off-on valve 87 and a modulating expansion valve 89. The line 85 leads to the annular region between the two concentric tubes, and at the other end of the subcooler 73, a vapor outlet line 91 connects to this region. The line 91 leads through a pressure regulator 93 to a compressor 95. The compressor discharges through a line 97 leading to the tube side of the heat-exchanger 83 that serves as the condenser-evaporator.

An outlet line 99 leads from the shell side of the heat-exchanger 83 to a compressor 101 which discharges through a line 103 leading to an ambient-air-cooled condenser 105. An outlet line 107 from the condenser leads to a liquid receiver 109. An outlet line 111 from the receiver leads to the inlet side of the shell portion of the heat-exchanger 83, and this line contains an on-off solenoid-operated valve 113 and a modulating expansion valve 115.

The modulating valve 115 is thermostatically controlled by suitable attachment to a sensor 117 that monitors the temperature of the vapor flowing toward the compressor 101 in the line 99. As the temperature rises, the modulating valve opens further so as to allow a greater flow of R-502 refrigerant through the valve and into the exchanger 83. The modulating valve 89 in the refrigerant line 85 leading toward the subcooler 73 is similarly controlled by a temperature sensor 119 that senses the temperature of the vapor in the line 91 exiting from the subcooler and which likewise sends a signal to the modulating valve. The signal can be electrical but is effectively carried out by the change in vapor pressure of a suitable substance within a capillary tube, as is well known in the art.

The condenser 105, which is ambient air-cooled, is preferably provided with a plurality of auxiliary fans 121 powered by electric motors 123. The fans are suitably controlled so as to provide the necessary cooling so as to effectively condense the higher temperature refrigerant in the condenser 105. They may be controlled from the ambient air temperature, or alternatively, a temperature sensor 125 may be used to monitor the temperature in the outlet line 107 sending a signal to a controller 127 which has the capacity to regulate operation of the fans. More specifically, as the temperature which is monitored begins to rise, a fan is started. If desired, each of the fans 121 may have a two-speed motor, so that a further rise would cause the controller 127 to increase the speed of operation of the fan and a still further rise would cause the sequential cut-in of additional fans until the desired temperature is maintained. Similarly, once a decrease in temperature below the desired temperature is detected, the controller 127 would begin to slow and/or stop the operation of one or more of the fans.

Should the operation of the snow-making equipment become particularly intense for a given period of time, it is possible that the higher temperature R-502 refrigerant system might not have the capacity to condense all of the R-13 refrigerant that is being vaporized in the subcooler 73. In this case, a relief valve 129 is connected to a by-pass line 131 which leads to an auxiliary set of condensing coils 133 disposed in the vapor portion of the $CO_2$ tank. These coils take advantage of the 0° F. $CO_2$ vapor in the tank 67 to condense R-13 vapor when the higher temperature mechanical refrigeration system is momentarily overloaded. A return line 135 from the coil leads back through a downstream-regulated valve 137 to a tee 136 where it joins with the line 91 leading to the suction regulator 93 on the suction side of the compressor 95. The regulator 93 will prevent the suction inlet pressure to the compressor from exceeding about 30 psig. However, when the pressure drops significantly below this figure, e.g., to 25 psig, the valve 137 will open so the compressor 95 will be able to suck vapor through the return line 135 from the auxiliary coil which serves as a reservoir for R-13 refrigerant in order to allow the compressor 95 to run generally continuously during daily operation of the processing plant.

The actual supply of the sub-cooled high-pressure liquid $CO_2$ to the snow-making apparatus 11 is controlled by the operation of the valve 57 by the solenoid 59. The solenoid is operated through the main control system 65 which opens the valve, after the presence of a container has been detected and the hood 13 has descended into operative sealing position closing an "operation" switch 139. A thermocouple 141 constantly monitors the temperature in the $CO_2$ delivery line 81 when the operation switch 139 closes to indicate the readiness to begin delivery of snow, a current-sensing relay in the temperature sensing circuit is activated from a bank 142 of such relays connected in parallel to close a specific relay depending upon the magnitude of the electrical signal being put out by the thermocouple 141. The closing of the contacts of this relay starts the timing circuit by placing a particular resistance in parallel with the timing resistor 143 from a bank 145 of resistances arranged in parallel and each connected to a respective set of contacts of a relay. The timing circuit applies power to the solenoid 59 opening the valve 57 and allowing high-pressure, cold liquid $CO_2$ to expand through the nozzles 53, delivering snow downward from the snow horns into the mass of food product packed in the container 25. The amount of the resistance that has been placed in parallel in the timing circuit determines the time interval the valve 57 will remain open.

Briefly, the overall operation is as follows with respect to the liquid $CO_2$ supply system 63. The compressors 95 and 101 operate, and the compressor 101 delivers high-pressure R-502 vapor to the condensor 105 at a temperature of about 200° to 225° F. and a pressure of about 137 psig. Condensation of the vapor to liquid R-502 takes place in the condenser 105 by heat-exchange with the ambient air that is supplied by the operation of one or more fans 121 as dictated by the temperature sensed and the controller 127. The liquid R-502 at about 70° F. is delivered to the receiver and then travels through line 111 upon opening of the solenoid valve 113 so as to be expanded through the modulating expansion valve 115 into the shell side of the heat-exchanger 83 at a temperature of about 0° F. and about 31 psig.

At the same time, the compressor 95 delivers high-pressure R-13 vapor at about 150° F. and about 225 psig. to the tube side of the heat-exchange 83 where it condenses to liquid by giving up heat to the cold R-502 vapor. The liquid R-13 at a temperature of about 20° F. leaves through the outlet line 85 and flows through the solenoid valve 87, expanding through the modulating expansion valve 89 and entering the annular region of the subcooler at about −70° F. and about 32 psig. The solenoid valves 113 and 87 are open whenever the compressors 95 and 101 are running. The liquid $CO_2$, which is preferably at at least about 300 psig. (0° F.) although liquid $CO_2$ in the range of between about 200 and 325 psig. might be used, flows out of the tank 67 through the line 71 and enters the subcooler 73. Its temperature preferably drops about 60° F. during normal operating conditions. Although a drop in temperature below equilibrium of only about 20° F. would still provide some improvement in efficiency, generally the liquid $CO_2$ temperature is lowered to between about −65° F. and about −55° F. The exit temperature of the R-13 vapor is monitored in the outlet line 91 by the sensor 119, and the modulating expansion valve opens wider to allow a greater flow rate of R-13 refrigerant if the temperature of the vapor rises above the desired temperature of about −60° F. Similarly, if the temperature in the R-502 vapor return line 99 rises above the desired upper temperature of about 10° F., the sensor 117 signals the modulating expansion valve 115 to open further and allow expansion of the R-502 refrigerant at a greater rate.

The temperature at the liquid $CO_2$ delivery line 61 upstream of the valve 57 is monitored by the thermocouple 141, and so long as the liquid $CO_2$ is at the desired low temperature of about −60° F., the smallest resistance is in parallel with the timer and the duration of time the control system 65 will hold the solenoid 59 open will be shortest. As repeated use of the snow-making apparatus occurs over a length of time, the flow rate of the liquid $CO_2$ through the subcooler may increase to such a degree that the entire drop of 60° F. will not be effected, causing the temperature of the high-pressure $CO_2$ being delivered by the subcooler to the snow-making apparatus in the line 81 to rise. This rise in temperature is detected by the thermocouple 141 which causes a different current-sensing relay to close, thus placing a greater time-adjusting resistor in parallel with the timing resistor 143. As earlier indicated, at a liquid $CO_2$ temperature of about −60° F. and 300 psig pressure, it is possible to efficiently deliver an amount of $CO_2$ snow equal to about 60% of the weight of the liquid $CO_2$ that is expanded through the nozzle in the snow horns 51. As the temperature rises, the invention rate to $CO_2$ snow will proportionately drop, and to compensate for this change, it is necessary to expand a greater amount of liquid $CO_2$ to obtain the desired metered amount of snow in a particular container. Accordingly, the control system 65 automatically senses the change in temperature and proportionately adjusts the time the solenoid-controlled valve 57 will be open through the timing circuit 145, thereby compensating for the lowering of the conversion rate by keeping the valve open for a proportionately longer time.

Overall, the apparatus operates extremely efficiently and is particularly valuable by being able to achieve a precise, metered charge of $CO_2$ snow in each container. This alleviates the human factor which previously required a manual adjustment to be made when the rising temperature of the liquid $CO_2$ being expanded failed to provide the desired amount of snow in each container. Oftentimes the conversion rate might drop substantially below 45 percent, requiring adjustment to the time of the "shot," which adjustments were not always immediately counteracted when the temperature of the liquid $CO_2$ returned to its design temperature, thus resulting in over-use of snow for a substantial period of time. Moreover, the increase in conversion of liquid $CO_2$ to about 60% actually delivered $CO_2$ snow constitutes a saving of up to about 50% in the amount of liquid $CO_2$ being expended when earlier systems were being operated at effective delivery rates of only about 40% snow.

Furthermore, the particular selection of the two-refrigerant system, with R-13 being used in heat-exchange with the liquid $CO_2$, prevents the high pressure line 71 from being inadvertently frozen solid and thus causing a blockage in the system. The physical characteristic of the R-13 refrigerant positively alleviates this potential problem in an effective subcooling system of this general type because it will not produce such a freezing temperature under its normal operating condition. The physical characteristics of R-502 are likewise a contributor to the overall efficiency because it not only effectively condenses the R-13 refrigerant, but it allows ambient air condensation, all at reasonable operating pressures so that special compressors are not required. The inlet pressure to each of the compressors should be maintained at about 20 psig. or above, and preferably above about 30 psig. for efficient and economical design and the outlet pressures which the compressors need achieve should preferably be in the range of about 200 psig. to 250 psig. or below.

Although the invention has been described with regard to certain preferred embodiments which constitute the best mode presently known to the inventors, it should be understood that various modifications as would be obvious to one having the ordinary skill in this art may be made without departing from the scope of the invention which is set forth in the claims appended hereto. For example, the liquid supply system 63 may include a suitable attachment to the high pressure vapor in the $CO_2$ tank so that the network 55 is purged of liquid by flushing with gas at the conclusion of each snow-making "shot."

Particular features of the invention are emphasized in the claims which follow.

What is claimed is:

1. A method of providing metered quantities of $CO_2$ snow, which method comprises
   supplying liquid $CO_2$ from a source at a pressure between about 200 and about 325 psig.,
   subcooling said liquid $CO_2$ to a temperature at least about 20° F. below the equilibrium temperature thereof at said pressure by heat-exchange with a refrigerant having a lower temperature provided by a mechanical refrigeration unit,
   periodically expanding said subcooled liquid $CO_2$ by passage through expansion means to create $CO_2$ snow for delivery to a receiver to be refrigerated, monitoring the temperature of said subcooled liquid $CO_2$ upstream of said expansion means, and delivering a metered quantity of $CO_2$ snow to each said receiver by automatically changing the duration of time of said periodic expansions relative to said temperature monitored.

2. A method in accordance with claim 1 wherein said liquid $CO_2$ is subcooled to a temperature between about $-65°$ F. and about $-55°$ F.

3. A method in accordance with claim 1 wherein said liquid $CO_2$ is subcooled by heat-exchange with a first refrigerant having a temperature between about $-60°$ F. and $-75°$ F. in its gaseous state at a pressure not lower than about 20 psig., and wherein said first refrigerant is compressed and condensed by heat-exchange with a second refrigerant which has a temperature of about $-10°$ F. to about $10°$ F. at a pressure of about 20 psig. or above, which second refrigerant is, in turn, condensed at ambient temperature after being raised to a pressure not greater than about 200 psig.

4. A method in accordance with claim 3 wherein said first refrigerant is R-13.

5. A method in accordance with either claim 3 or 4 wherein said second refrigerant is R-502.

* * * * *